United States Patent
Gulkis et al.

(10) Patent No.: US 10,073,758 B2
(45) Date of Patent: Sep. 11, 2018

(54) PERFORMANCE OF A WRAPPED APPLICATION

(71) Applicant: Citrix Systems, Inc., Fort Lauderdale, FL (US)

(72) Inventors: Daniel Gulkis, Wellington, FL (US); David Linde, Wellington, FL (US); Shweta Subramani, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/800,371

(22) Filed: Jul. 15, 2015

(65) Prior Publication Data

US 2017/0017562 A1 Jan. 19, 2017

(51) Int. Cl.
G06F 11/36 (2006.01)
G06F 21/53 (2013.01)
H04W 4/60 (2018.01)

(52) U.S. Cl.
CPC .......... *G06F 11/3612* (2013.01); *G06F 21/53* (2013.01); *H04W 4/60* (2018.02)

(58) Field of Classification Search
None
See application file for complete search history.

(56) References Cited

U.S. PATENT DOCUMENTS

| 8,788,783 | B1 | 7/2014 | Karnati et al. |
| 9,569,443 | B1* | 2/2017 | van Rietschote ... G06F 17/30076 |
| 2002/0133504 | A1* | 9/2002 | Vlahos ............ G06F 17/30566 |
| 2005/0198298 | A1* | 9/2005 | Nishikawa ......... G06F 11/3409 709/226 |
| 2007/0180275 | A1* | 8/2007 | Metzger ............. G06F 21/6227 713/194 |
| 2007/0299814 | A1* | 12/2007 | Barsness .......... G06F 17/30442 |
| 2014/0281708 | A1* | 9/2014 | Adam ................ G06F 11/1443 714/18 |

(Continued)

FOREIGN PATENT DOCUMENTS

WO 2012061771 A1 5/2012

OTHER PUBLICATIONS

Chaudhuri et al., "Self-Tuning Technology in Microsoft SQL Server", IEEE Computer Society Technical Committee on Data Engineering, Copyright 1999, ftp://ftp.research.microsoft.com/pub/debull/99june/msft.ps, access on Jun. 13, 2016.*

*Primary Examiner* — S. Sough
*Assistant Examiner* — Timothy P Duncan
(74) *Attorney, Agent, or Firm* — Banner & Witcoff, Ltd.

(57) ABSTRACT

Systems, methods, and computer-readable media for securing a mobile device application using an application wrapper while preserving and/or improving performance of the wrapped application are presented. In one or more embodiments, an application wrapper may detect, during execution of a wrapped application, at least one performance caused by the application wrapper. The application wrapper may modify execution of the wrapped application to address the at least one detected performance issue. In some instances, the at least one performance issue may be associated with a cache that stores one or more pages from a database, and the cache and the database may be maintained within the wrapped application.

19 Claims, 8 Drawing Sheets

(56) References Cited

U.S. PATENT DOCUMENTS

2014/0297840 A1 10/2014 Qureshi
2015/0178506 A1* 6/2015 Elovici ................ G06F 21/602
                     713/189

* cited by examiner

PERFORMANCE OF A WRAPPED APPLICATION

BACKGROUND

Aspects of the disclosure relate to computer hardware and software. In particular, one or more aspects of the disclosure generally relate to computer hardware and software for improving performance of a wrapped application.

Mobile devices are becoming increasingly popular for both personal use and business use. Corporations and other organizations are providing their employees and other associates with, and/or otherwise enabling their employees and other associates to use, mobile devices, such as smart phones, tablet computers, and other mobile computing devices. As these devices continue to grow in popularity and provide an increasing number of functions, many organizations may wish to ensure that the software applications that are executing on such devices are safe and secure, both for the protection of the device users and for the protection of the organization itself and its own computer systems and networks.

As companies and other organizations take steps to secure mobile devices, however, it can be difficult to achieve desired levels of security while preserving, if not improving upon, the efficient and effective performance of such mobile devices and the software which may be executed on these devices.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure provide efficient, effective, convenient, and scalable techniques for securing mobile devices and/or the software that may be executed on such devices while preserving the efficient and effective performance of these devices and/or the software that they may execute.

In some instances, an organization may secure a particular mobile device and/or a particular software application (which may, e.g., be executed by a mobile device) by wrapping the software application with an application wrapper. Such an application wrapper may, for example, provide a policy enforcement layer that may intercept input to the application, output from the application, and/or function calls made by the application to modify and/or otherwise alter the typical and/or default manner in which the application may be executed. In particular, the application wrapper may enforce one or more policies (which may, e.g., be defined in one or more policy files) on the application that may be set by the organization seeking to secure the mobile device and/or the particular application. The policies may, for example, prevent specific features of the application from being used when the mobile device and/or the application is in one or more specific states (e.g., if the device is in a restricted location, if the device is connected to an unsecured network, if one or more other specific programs are open and/or running on the device, etc.). Thus, in enforcing such policies, the application wrapper may selectively enable and/or selectively disable one or more specific features of the application based on device state information (which may, e.g., be monitored by the application wrapper and/or by a mobile device management agent which may be installed on the device and which may communicate with the application wrapper).

By securing a mobile device and/or a particular mobile device application with an application wrapper, an organization may, for instance, be able to control how the application is executed by a plurality of different mobile devices that are used by a plurality of different enterprise users (who may, e.g., be employees of the organization and/or otherwise associated with the organization). In some instances, however, wrapping an application with an application wrapper in this manner may negatively impact the performance of the wrapped application during execution. For example, the application may take an unacceptable amount of time to respond to specific commands, and in some instances, may time out completely due to the additional processing performed by the application wrapper while enforcing policies during execution of the wrapped application.

By implementing various aspects of the disclosure, however, an organization may be able to secure a mobile device and/or a specific mobile device application using an application wrapper while preserving and/or improving performance of the wrapped application during execution.

For example, some embodiments discussed in greater detail below are directed to techniques for improving performance of the execution of a wrapped application. In particular, in some arrangements discussed below, an application wrapper may detect, during execution of a wrapped application, at least one performance issue caused by the application wrapper. Based on detecting the at least one performance issue, the application wrapper may modify execution of the wrapped application to address the at least one detected performance issue. In some instances, the performance issue may be associated with a cache that stores one or more pages from a database (which may, e.g., be accessed and/or otherwise used by the wrapped application during execution). In addition, in detecting the at least one performance issue, the application wrapper may monitor and/or analyze one or more performance parameters, such as the amount of time required to complete one or more transactions associated with the cache, the cache miss rate, the size of the cache, rate of page faults, and/or the transactions being performed on the cache. In some instances, the application wrapper may persistently store the values of performance parameters and utilize this historical data at a future time and/or during a new execution of the application. In some instances, the application wrapper may address and/or resolve the performance issue by modifying the size of the cache. In some instances, the detection of various performance issues and modification of various parameters to address such issues may be repeated by the application wrapper as the wrapped application continues to execute.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and in which.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
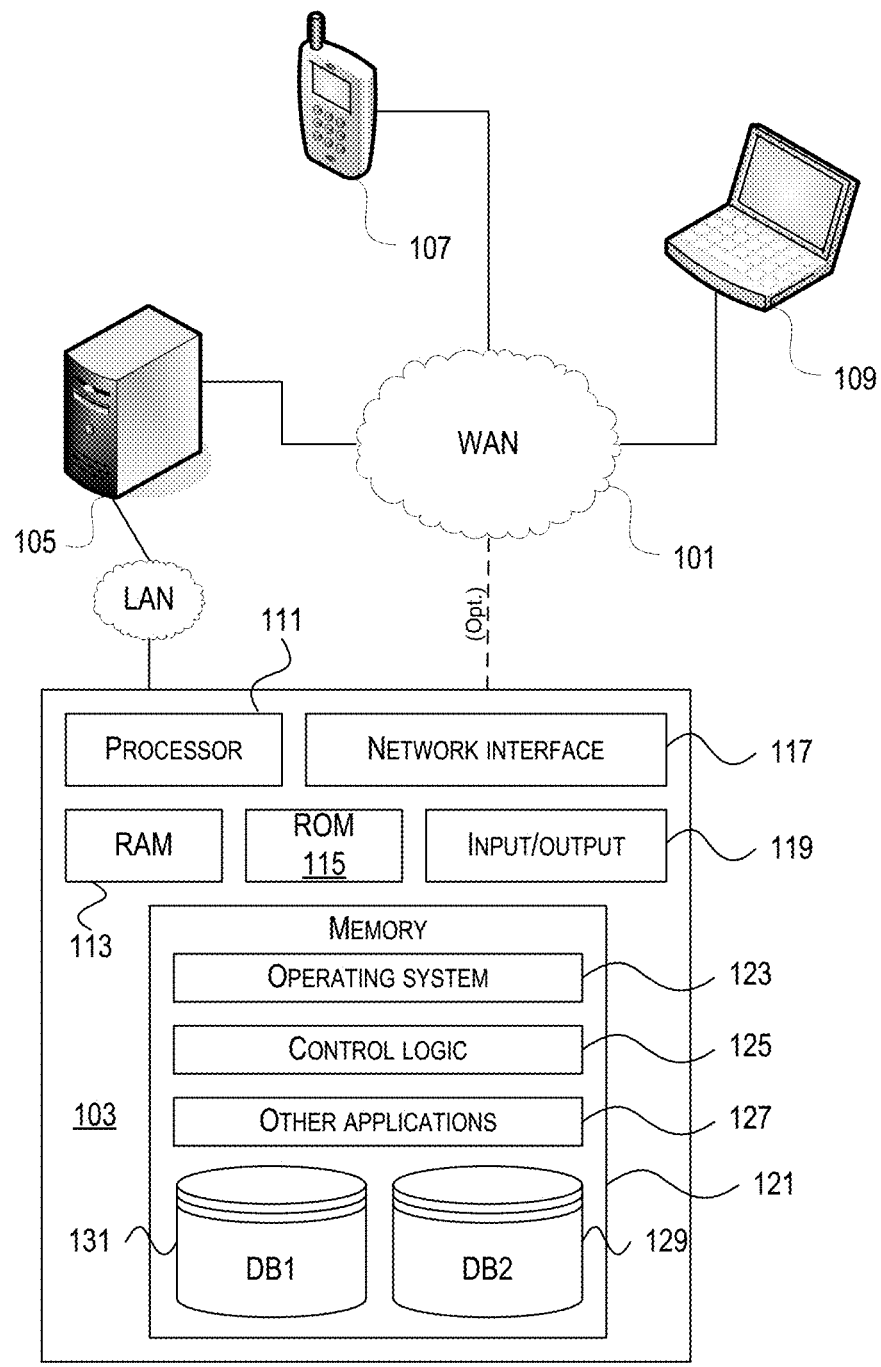
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
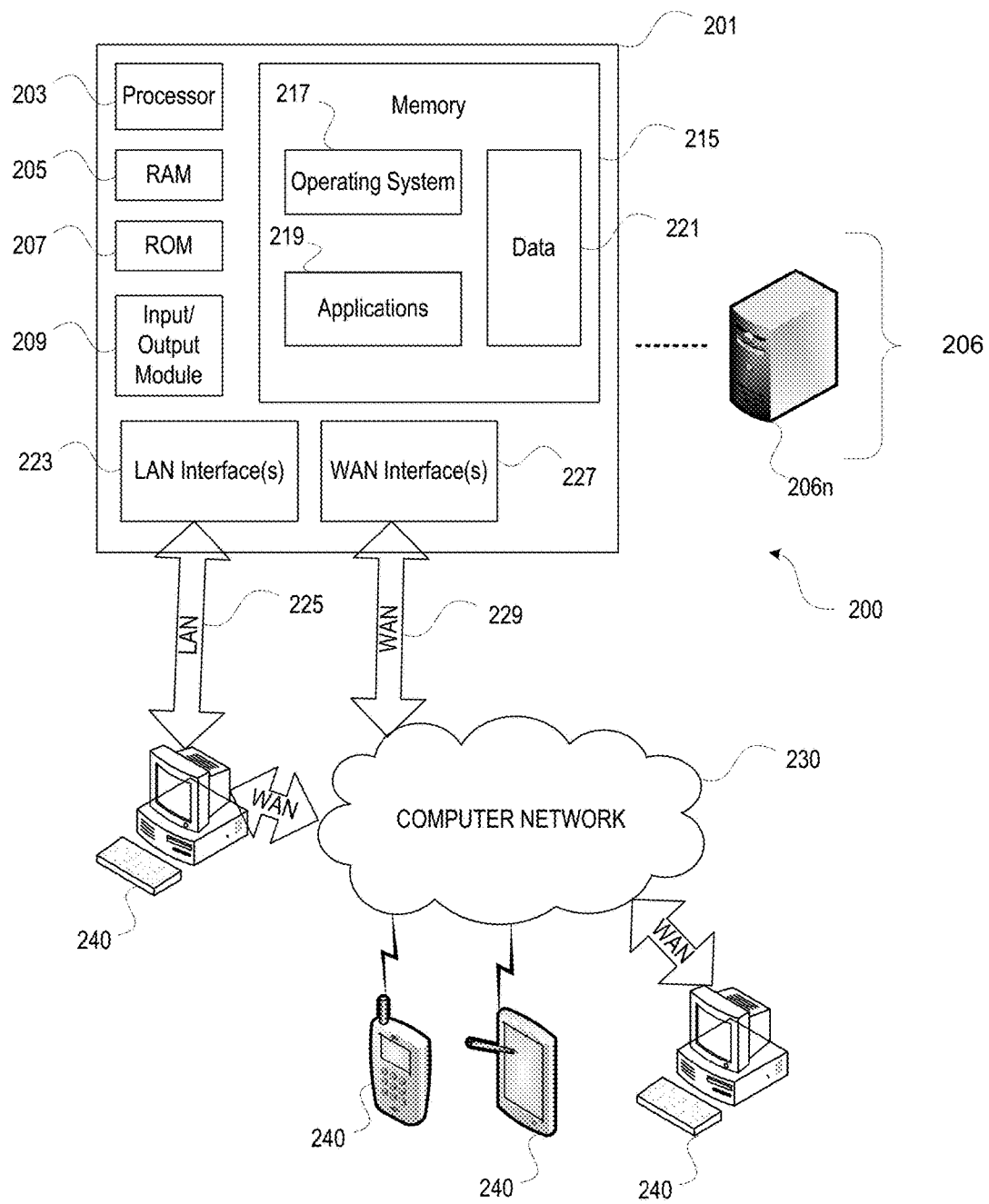
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
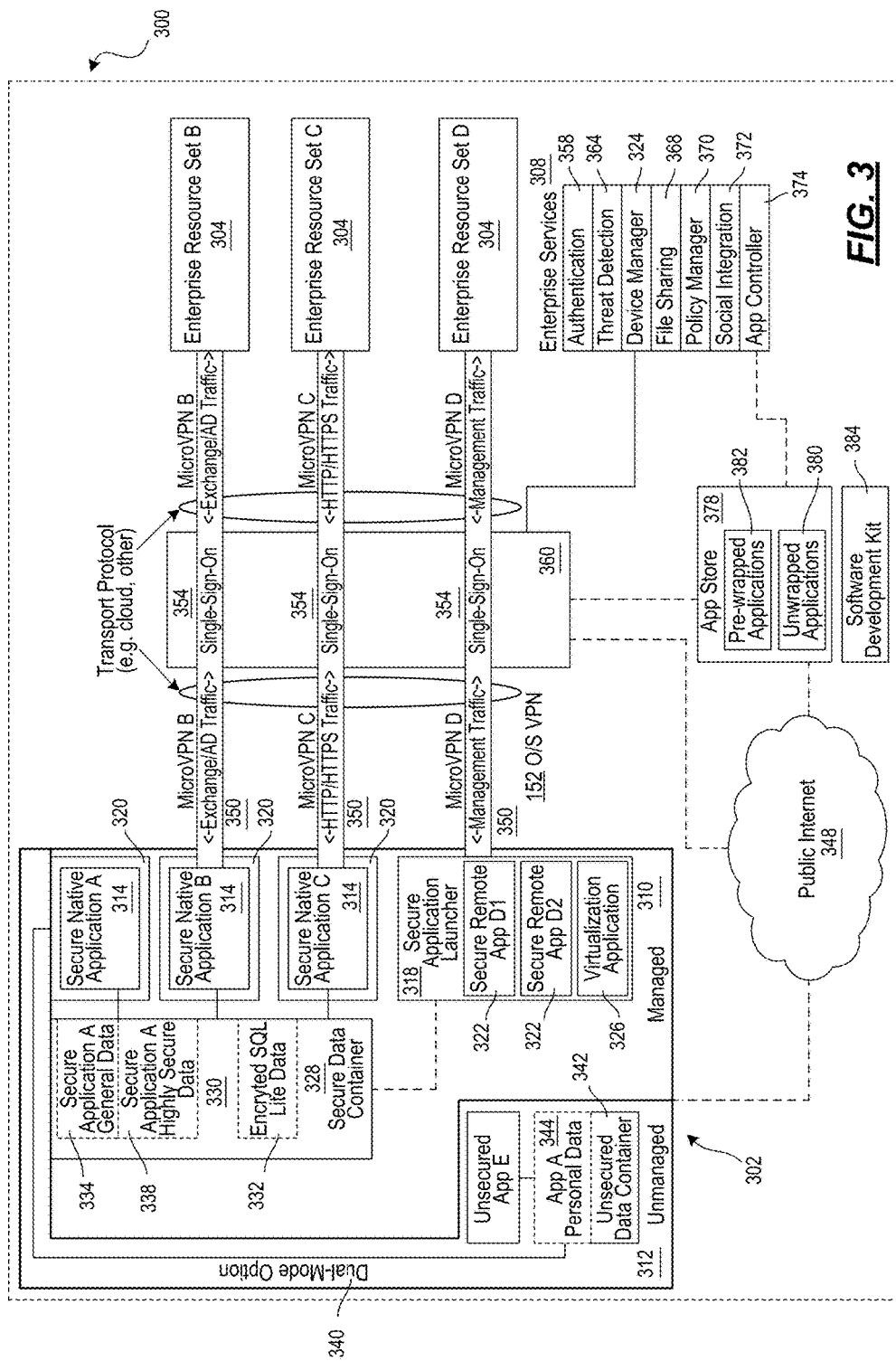
FIG. 3 depicts an illustrative enterprise mobility management system that may be used in accordance with one or more illustrative aspects described herein.

FIG. 3 represents an enterprise mobility technical architecture 300 for use in a BYOD environment. The architecture enables a user of a client device (e.g., mobile device) 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 302. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 302 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 548 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like 352. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
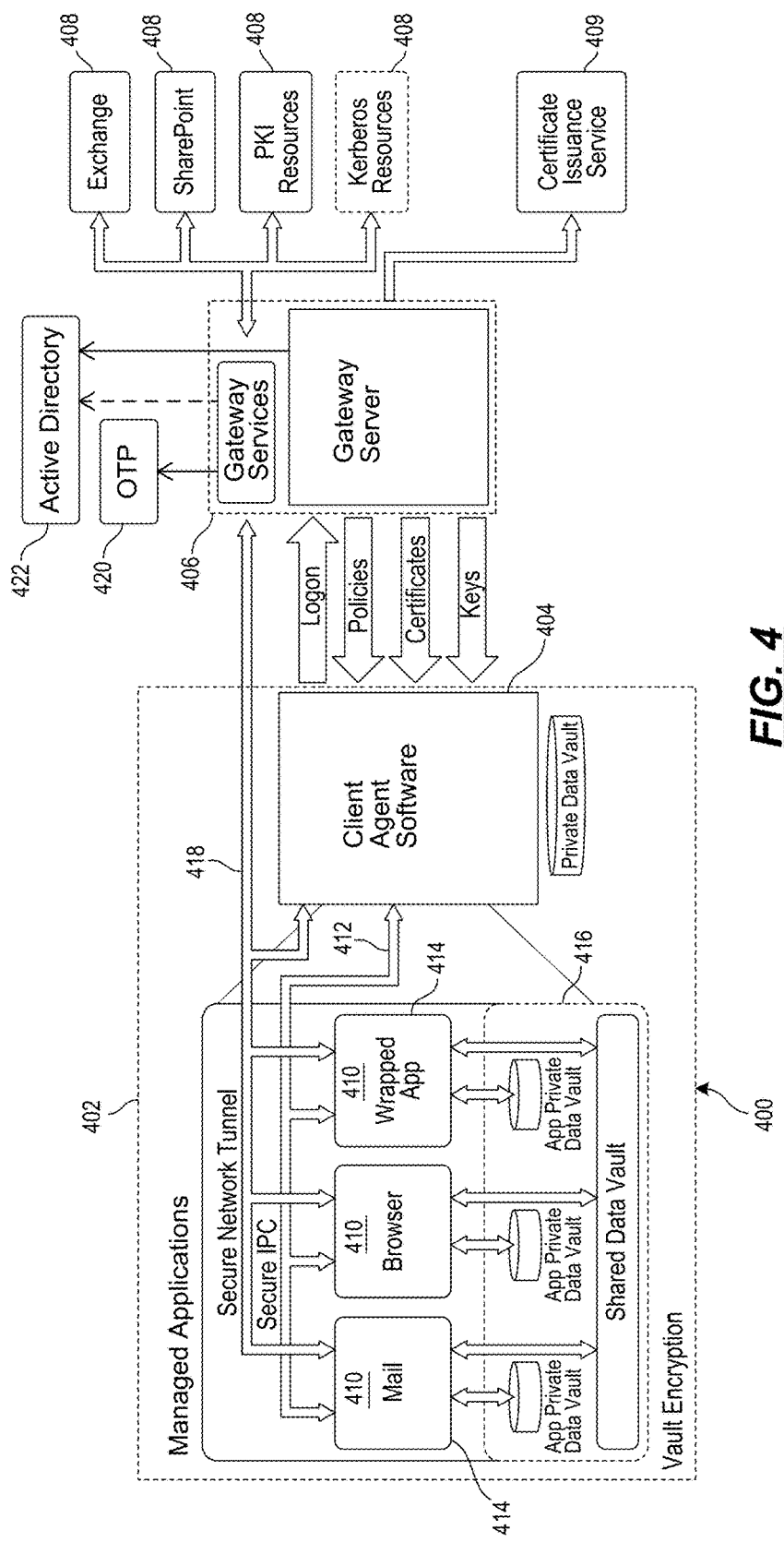
FIG. 4 depicts another illustrative enterprise mobility management system that may be used in accordance with one or more illustrative aspects described herein.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 400 described above with reference to FIG. 3 and may include additional features not mentioned above.

In this case, the left hand side represents an enrolled client device (e.g., mobile device) 402 with a client agent 404, which interacts with gateway server 406 (which includes Access Gateway and application controller functionality) to access various enterprise resources 408 and services 409 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local operating system (OS) services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected.

For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be serviced from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Illustrative Embodiments

Figure 5:
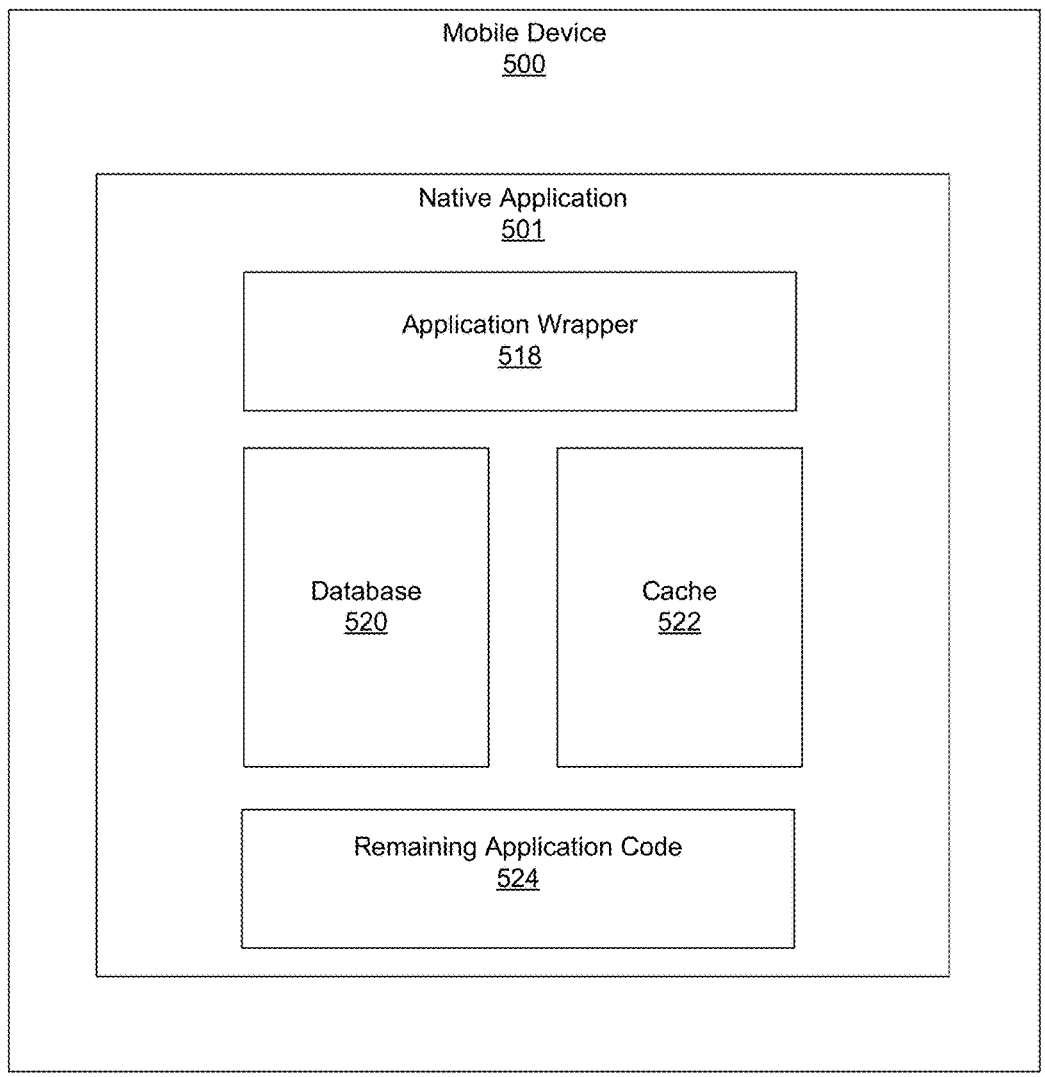
FIG. 5 depicts an example of a mobile computing device that includes a wrapped application in accordance with one or more illustrative aspects discussed herein.

Having discussed several examples of computing architectures and the enterprise mobility management architecture that may be used in providing and/or implementing various aspects of the disclosure, a number of embodiments will now be discussed in greater detail. In particular, and as introduced above, some aspects of the disclosure generally relate to improving performance of the execution of a wrapped application. FIG. 5 shows an exemplary native wrapped application 501 that may be stored and executed on mobile device 500.

The native wrapped application 501 may be wrapped by an application wrapper 518. The application wrapper 518 may include integrated policies that are executed on the mobile device 500 when the native application 501 is executed on the device. Introducing an application wrapper 518 within native application 501 may affect the performance of the application. In particular, and as introduced above, some aspects of the disclosure generally relate to detecting at least one performance issue with the execution of a wrapped application, in which the performance issue is caused by the wrapping process, and modifying execution of the wrapped application to address the performance issue.

For example, as a result of wrapping application 501 by application wrapper 518, database 520 may be encrypted. The addition of encryption may result in poor database performance, as pages written to database 520 must be encrypted and pages read from database 520 must be decrypted.

One or more pages from database 520 may be stored in cache 522. The pages in cache 522 may be stored in a decrypted form. As a result, pages written to cache 522 do not need to be encrypted and pages read from cache 522 do not need to be decrypted. When database 520 receives a read or write request, database 520 may determine if the corresponding page(s) is stored in cache 522. If the corresponding page is stored in cache 522, database 520 will access the corresponding page directly from cache 522. As pages in cache 522 may be decrypted, database 520 does not have to encrypt or decrypt the page. If, however, the corresponding page is not stored in cache 522, database 520 will access the file system layer and issue an appropriate read or write request. Any page accessed at this level by database 520 as a result of this request must then be decrypted. The decrypted page may then be stored in cache 522 for subsequent access by the database 520.

Detecting degradation in performance of database 520 may be done by utilizing various measurements and methods of analysis. For example, the system may measure how much time is required for the database 520 to respond to read or write requests. The system may also analyze the hit rate or the miss rate of cache 522. The hit rate may, for example, correspond to the number of requests to read information from database 520 that were successfully handled using information stored in cache 522 divided by the total number of requests to read information that were received. Additionally or alternatively, the miss rate may correspond to the number of requests to read information from database 520 that could not be handled using information stored in cache 522 (and for which, e.g., non-cached data from database 520 had to be accessed and/or decrypted to handle the particular read request) divided by the total number of requests to read information that were received. The system may also analyze the rate of page faults of cache 522. A page fault may, for example, correspond to an interrupt that occurs when there is an attempt to access a page in cache 522 that is mapped into the virtual address space, but not loaded in physical memory. The system may analyze the size of cache 522 relative to other parameters, including, but not limited to, the size of database 520 and/or available memory resources on mobile device 500. Additionally, performance of the wrapped application 501 may be compared to performance of a similar, non-wrapped application. These features and additional examples will be discussed in more detail below.

Once degradation in performance of a specific wrapped application is detected (e.g., by the application wrapper of the wrapped application), it may be advantageous to modify execution of wrapped application 501 to regain the performance loss caused by introducing application wrapper 518. The modification of execution of wrapped application 501 may be done by modifying various operating parameters (e.g., of the wrapped application and/or of the application) and/or by using various algorithms (e.g., to determine optimal values for such operating parameters).

In the example provided above, one factor that that may affect performance of database 520 is the size of cache 522. If cache 522 is small, attempts by database 520 to access pages will result in a high number of cache misses, forcing the database to perform the additional step of decrypting any needed pages. If cache 522 is large enough to store all of the pages of database 520 in decrypted form, performance of application 501 is improved because pages only need to be decrypted once, even if referenced multiple times.

However, increasing the size of cache 522 may have rippling effects on overall system performance. For example, memory on mobile device 500 is finite and if the size of cache 522 is above a certain threshold, application 501 may occupy a disproportionate amount of this memory. Thus, the size of cache 522 may be restrained by available system resources. In another example, increasing the size of cache 522 may result in an increase in the rate of page faults. Other exemplary factors that may be considered when determining the size of cache 522 include, but are not limited to, the frequency of database accesses by wrapped application 501, the size of database 520, the threshold limit on the size of cache 522, the hit or miss rate of cache 522, and the size of database transactions. These features and additional examples will be discussed in more detail below.

Various algorithms may be used to modify the size of cache 522. For example, the size may be increased to a threshold size limit. Alternatively, the size may be incrementally adjusted on a one-time basis or until a target performance value is reached. These features and additional examples will be discussed in more detail below.

Figure 6:
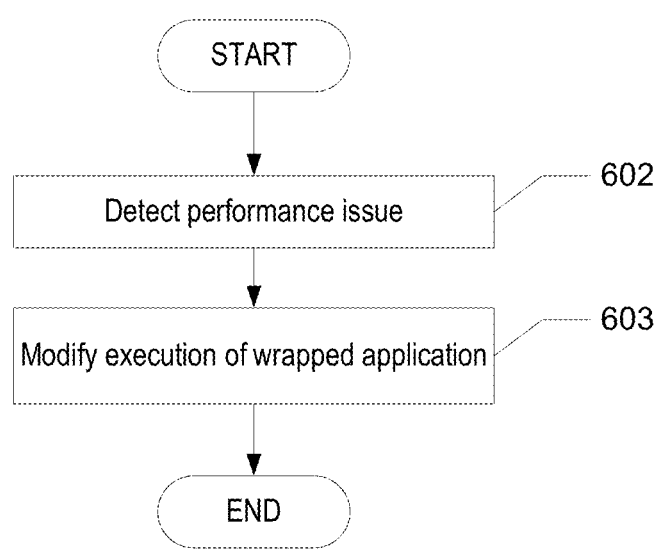
FIGS. 6-8 depict flowcharts that illustrate methods of improving performance of an execution of a wrapped application in accordance with one or more illustrative aspects discussed herein.

FIG. 6 depicts an illustrative method of improving performance of an execution of a wrapped application. The method may start before the wrapped application 501 begins executing on the mobile device 500, may be invoked at the time the wrapped application 501 begins executing on the mobile device 500, or may be invoked after the wrapped application 501 begins executing on the mobile device 500. At step 602, the application wrapper may detect a performance issue with the execution of wrapped application 501, and the performance issue may be caused by and/or otherwise arise as a result of the wrapping of the application.

The performance issue may be any degradation in performance of the execution of wrapped application 501 caused by the wrapping of the application. For example, if wrapping of the application negatively affects the timing of the execution of the application (e.g., the application runs slower due to wrapping than if the application had not been wrapped), such an issue may be detected. Alternatively, if wrapping of the application negatively affects the system resources used by the application (e.g., the application uses more memory, processing power, network bandwidth, data consumption, and/or other system resources than if the application had not been wrapped), such as issue may be detected. Timing and resource utilization are only exemplary of the types of performance issues that may be detected in some instances, and any similar performance issues that are caused by the wrapping of the application may be detected in other instances.

Generally, the performance issues may be detected by application wrapper 518. The application wrapper 518 may monitor operating parameters of the execution of wrapped application 501 to determine if there are performance issues. For example, the application wrapper 518 may analyze the value of an operating parameter for a specific point in time. Alternatively, the application wrapper 518 may analyze the value of an operating parameter for a predetermined or dynamically determined time interval. In another example, the application wrapper 518 may monitor the value of an operating parameter using a sliding time window.

The application wrapper 518 may monitor more than one parameter simultaneously and may monitor different parameters at different times. A first operating parameter may be monitored for a specific point of time, while a second operating parameter may be measured for a dynamically determined time interval (or any other combination for any number of operating parameters may be used). The application wrapper 518 may analyze the values of the operating parameters individually, relative to one another, relative to other system parameters, or in combination with one another. The operating parameters to be monitored by application wrapper 518 may be determined prior to, at the start of, or during the execution of wrapped application 501. Additionally, the application wrapper 518 may dynamically modify, during execution of wrapped application 501, which operating parameters are monitored.

At step 603, the application wrapper 518 may modify execution of the wrapped application 501 to address the performance issue. The modification may be predetermined, or may be dynamically determined by the application wrapper 518 once the performance issue is discovered and/or otherwise detected. For example, if the application wrapper 518 determines that a first operating parameter (e.g., page size for cached data obtained from the database or the size of the cache or the size of the database) is affected by the wrapping of the application, the application wrapper 518 may perform one or more modifying steps that have been predetermined for such a scenario. Exemplary steps include, but are not limited to, modifying the first operating parameter, modifying a different operating parameter, or modifying a combination of operating parameters.

Alternatively, the application wrapper 518 may dynamically determine the modifications to be made once the performance issue has been detected. Upon detecting a performance issue related to a first operating parameter, the application wrapper 518 may weigh a plurality of modification options and select the optimum modification. For example, the application wrapper 518 may determine that the value of the first operating parameter is already at a threshold value, and thus must modify the execution of the application to resolve and/or otherwise address the performance issue without modifying the first performance parameter. In such a scenario, the application wrapper 518 may then select between modifying a second operating parameter and a third operating parameter, and may, in one exemplary instance, dynamically select to modify both the second and third operating parameters.

In one specific example of such a dynamic determination, the application wrapper 518 may, while monitoring the execution of application 501, determine that the value of a first performance parameter, the cache hit rate, is too low. In response, application wrapper 518 may increase the size of cache 522. Application wrapper 518 then may continue monitoring the performance of application 501. During this continued monitoring, application wrapper 518 may determine that the value of a second performance parameter, the rate of page faults, is too high. The application wrapper 518 may determine that the increase in the rate of page faults is caused by the increased cache size and may then dynamically weigh the effects of decreasing the size of cache 522 (and thus decreasing the rate of page faults while also decreasing the cache hit rate) versus maintaining the current size of cache 522 (and thus allowing the rate of page faults to remain high in order to keep the cache hit rate high). In one instance, the application wrapper 518 may determine that it is more efficient to decrease the size of cache 522 and proceed accordingly. However, in another instance, the application wrapper 518 may determine that it is more efficient to maintain the size of cache 522 (i.e. it is more efficient to re-read unencrypted pages than to re-read and re-decrypt pages) and proceed accordingly.

As noted above, database 520 may be encrypted as a result of wrapping application 501 by application wrapper 518. The addition of encryption may result in poor database performance, as pages written to database 520 must be encrypted and pages read from database 520 must be decrypted. One or more pages from database 520 may be stored in cache 522. The pages in cache 522 may be in decrypted form. As a result, pages written to cache 522 might not need to be encrypted and pages read from cache 522 might not need to be decrypted.

Therefore, in one example scenario, application wrapper 518 may detect the performance issue of database 520 by monitoring the sizes of database 520 and cache 522. If the size of the cache 522 is equivalent to the size of the database 520, the application wrapper 518 may conclude there is no database-related performance issue. On the other hand, if the size of cache 522 is less than the size of database 520, the application wrapper may continue monitoring both operating parameters (e.g., the size of database 520 and the size of cache 522), as well as any other related operating parameters, if the difference in size has not yet reached a predetermined level. As noted above, such monitoring may be done at a specific time, over a specified time interval, or over a sliding time window. If the difference in size between the database 520 and cache 522 is at a predetermined value (or alternatively, within a predetermined range), the application wrapper 518 may determine that this is a performance issue, and proceed to step 603.

In this example scenario, at step 603, the application wrapper 518 may modify execution of the wrapped application 501 to address the database-related performance issue. If the size of the cache 522 is below a threshold limit, the application wrapper 518 may increase the size by a predetermined value or by a dynamically determined value. In addition to the threshold limit, the application wrapper 518 may evaluate whether increasing the size of cache 522 will result in the wrapped application using a disproportionate portion of system resources.

In a second example scenario, the application wrapper 518 application may detect a wrapper-related performance issue by monitoring the miss rate of cache 522. As noted above, such monitoring may be done at a specific time, over a specified time interval, or over a sliding time window. If, at step 602, the application wrapper 518 determines that the miss rate of cache 522 is higher than a predetermined or dynamically calculated value, the application wrapper may proceed to step 603.

In this second example scenario, at step 603, the application wrapper 518 may modify execution of the wrapped application 501 to address the database-related performance issue. In making the modifications, the application wrapper 518 may evaluate and/or analyze constraints on the operating parameters (such as, for example, threshold limits, available system resources, etc.). To address the miss rate, the application wrapper 518 may adjust the size of cache 522. In doing so, the application wrapper 518 may evaluate the current size of cache 522, the miss rate, the threshold limit on cache size, the size of database 520, the amount of system resources being used by the execution of wrapped application 501, and/or other related parameters.

For example, increasing the size of cache 522 by a first amount may reduce the miss rate by a second amount while increasing the portion of system memory used by the wrapped application 501 by a third amount. The application wrapper 518 may weigh each of these values and determine whether the size of cache 522 should be increased, and if so, by how much. In one instance, the application wrapper 518 may determine that increasing the size of cache 522 by 10% would reduce the miss rate by 5%, but would increase the portion of system memory used by the wrapped application 501 by 20%. Accordingly, the application wrapper 518 may determine that the cache size should not be increased by 10%, and may look to alternative modifications of execution of the wrapped application 501 (including, but not limited to, increasing the size of cache 522 by a different value).

In a second instance, the application wrapper 518 may determine that increasing the size of cache 522 by 10% would reduce the miss rate by 25%, but would increase the portion of system memory used by the wrapped application 501 by 2%. The application wrapper 518 may decide that this is an acceptable outcome and may increase the size of cache 522 by 10%. Alternatively, the application wrapper 518 may, based on this calculation, determine that 10% is not an optimum value and may perform additional calculations to determine if the size of cache 522 should be increased by a different amount.

In a third example scenario, the application wrapper 518 may monitor the timing-related operating parameters of database 520. As noted above, such monitoring may be done at a specific time, over a specified time interval, or over a sliding time window. The application wrapper 518 may measure how long different transactions to and from the database 520 take to complete. In addition, the application wrapper 518 may evaluate the size of each of the transactions. If the transaction times are above a predetermined threshold or within a certain range, the application wrapper may proceed to step 603

In this third example scenario, at step 603, the application wrapper 518 may modify execution of the wrapped application 501 to address the database-related performance issue. In making the modifications, the application wrapper 518 may evaluate and/or analyze constraints on the operating parameters (such as, for example, threshold limits, available system resources, etc.). In one instance, the application wrapper 518 may evaluate whether increasing the size of cache 522 will address the performance issue.

In one instance, the application wrapper 518 may determine that a sequence of operations to add one thousand records to the database 520 is taking too long to complete. In response, the application wrapper 518 may first look at the size of the transactions. For example, if there are one thousand transactions, each directed to adding one record to the database, the application wrapper 518 may determine that increasing the size of cache 522 will not address the issue, and may search for alternative solutions. However, if there are only ten transactions, each directed to adding one hundred records to the database 520, the application wrapper 518 may determine that the size of the cache 522 should be increased, and take the appropriate modifying actions. In increasing the size of cache 522, the application wrapper 518 may take into consideration threshold limits on the cache size, available system resources, the portion of system resources currently used by wrapped application 501, and other factors that may be relevant.

In the examples provided above, the application wrapper 518 monitors various operating parameters and compares the parameters to predetermined values or dynamically determined values. In one instance, benchmark values for the operating parameters may be determined through the use of a model database (and corresponding model cache). The model database may be similar or identical to database 520, except that the model database may be unencrypted. Transactions that are similar or identical to those executed by wrapped application 501 on database 520 may be executed on the unencrypted model database. Performance of the model database and cache may be determined by monitoring various operating parameters, which may be similar to, but are not limited to, the operating parameters monitored by application wrapper 518. The values of these operating parameters may then be used as benchmark values for the operating parameters in the execution of wrapped application 501. For example, the miss rate of the model cache may be used as the target miss rate for cache 522. Additionally or alternatively, the size of the model database may be used as the threshold limit on the size of database 520.

Figure 7:
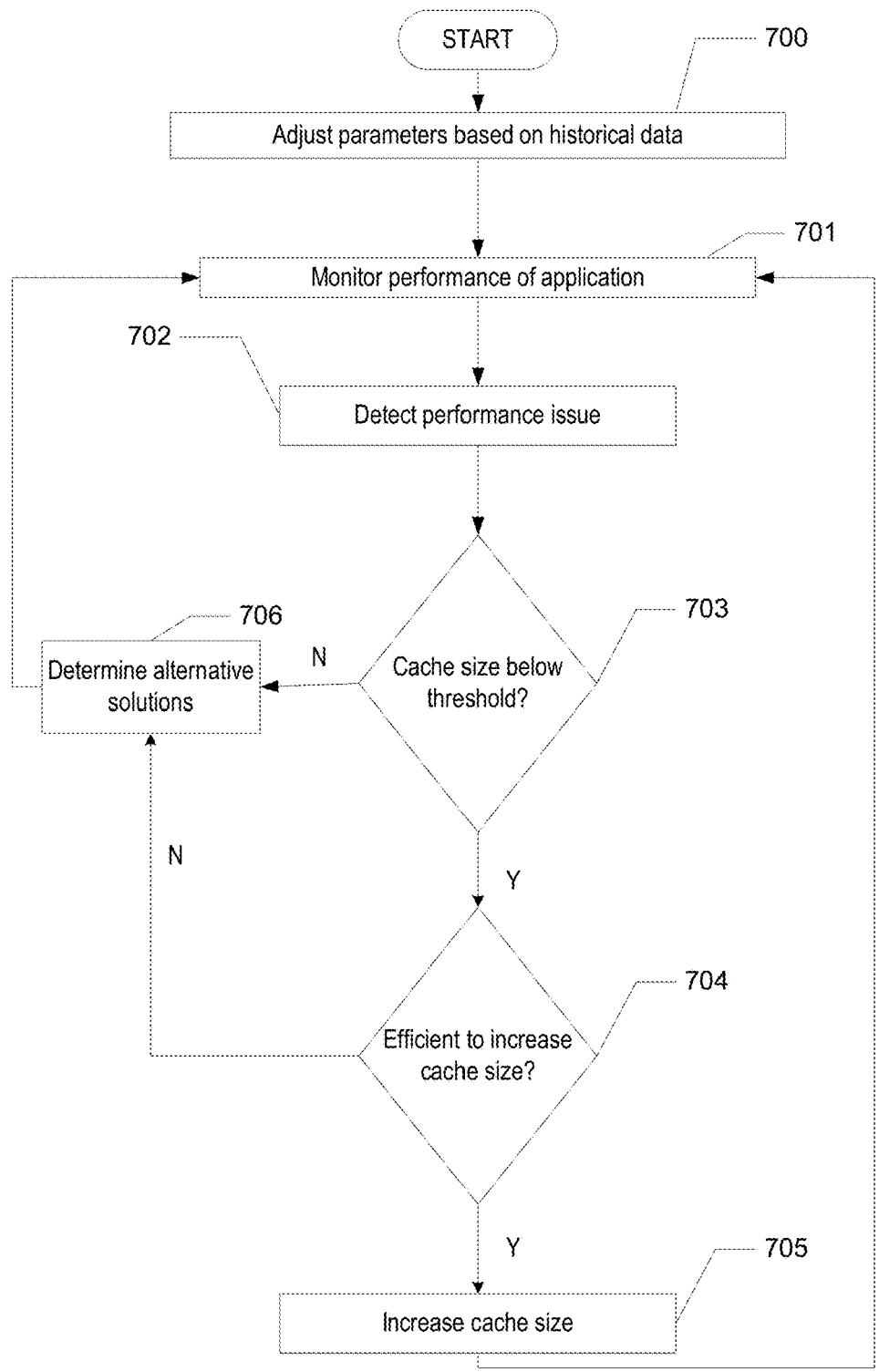

FIG. 7 depicts an illustrative method of improving performance of an execution of a wrapped application using historical data. The method may start before the application 501 begins executing on the mobile device 500, may be invoked at the time the application 501 begins executing on the mobile device 500, or may be invoked after the wrapped application 501 begins executing on the mobile device 500. At step 700, application wrapper 518 may adjust the values of operating parameters based on historical data. This historical data may refer to a previous execution of wrapped application 501. Alternatively, the historical data may refer to a previous instance in time or previous time interval in the instant execution of wrapped application 501. The historical data may be aggregated over multiple time intervals and/or multiple prior executions of wrapped application 501. Application wrapper 518 may have previously analyzed the historical data to determine optimal initial values for operating parameters and/or threshold values for operating and performance parameters.

In one example, application wrapper 518 may determine, by monitoring multiple executions of wrapped application 501, that following the initial launching of wrapped application 501, there is an increase in the number of database transactions for a certain time interval. This may be caused by wrapped application 501 removing old data from database 520 and then compacting database 520. Additionally, or alternatively, application wrapper 518 may have determined, through monitoring previous instances of executions of wrapped application 501, that a spike in database transactions tends to occur if wrapped application 501 executes for a certain period of time. Application wrapper 518 may store any such determined trends for reference during a future time interval in the instant execution of wrapped application 501 and/or during a subsequent execution of wrapped application 501

In addition to monitoring the historical number of database transactions, application wrapper 518 may also have monitored the historical adjustments made by application wrapper 518 in response to the detection of performance issues. For example, if application wrapper 518 increases the size of cache 522 in response to noting a spike in database transactions, the new size may be stored by application wrapper 518 for reference during a future time interval in the current execution of wrapped application 501 and/or during a subsequent execution of wrapped application 501. Any other instances of adjusted parameter values may subsequently be stored and aggregated by application wrapper 518. Application wrapper 518 may then analyze the aggregated data to determine optimal operating parameter values and target performance values at certain points in time and/or certain time intervals. This allows application wrapper 518 to make efficient re-use of data and allows the application wrapper to pre-empt known performance issues that arise as a result of the wrapping.

In the current example, once an execution of wrapped application 501 is initiated, application wrapper 518 may immediately adjust the value of the size of cache 522 based on analyses of historical values. Alternatively, application wrapper 518 may adjust the size of cache 522 based on the application wrapper's analysis of historical parameter values if the execution of wrapped application 501 is still ongoing after one hour. Application wrapper 518 may use historical data to adjust the values of one or more operating parameters. The adjustments may be made to achieve target performance levels for any one or more operating parameters.

At step 701, application wrapper 518 may continuously monitor one or more parameters of wrapped application 501 subsequent to the initial adjustment of parameters. The parameters may be continuously monitored until a performance issue is detected and may resume once the performance issue has been addressed. Alternatively, if a wrapper-related performance issue is detected, application wrapper 518 may concurrently monitor the parameters and address the wrapper-related performance issue. During the continuous monitoring, application wrapper 518 may aggregate the values of the monitored parameter(s). The aggregated values may be persistently stored such that the aggregated values may be later utilized in the current execution of wrapped application 501 or during a subsequent execution of wrapped application 501 (e.g. these aggregated values may be used during a subsequent execution as historical values). The application wrapper 518 may analyze the value of a parameter at a specific point in time. Alternatively, the application wrapper 518 may analyze the value of a parameter for a predetermined or dynamically determined time interval. In another example, the application wrapper 518 may monitor the value of a parameter using a sliding time window. The application wrapper 518 may monitor more than one parameter simultaneously and may monitor different parameters at different times. For example, application wrapper 518 may monitor the size of cache 522 and/or the hit rate of cache 522. A first parameter may be monitored for a specific point of time, while a second parameter may be measured for a dynamically determined time interval (or any other combination for any number of operating parameters may be used). The application wrapper 518 may analyze the values of the parameters individually, relative to one another, relative to other system parameters, or in combination with one another. Additionally, the application wrapper 518 may dynamically modify, during execution of wrapped application 501, which parameters are monitored.

At step 702, the application wrapper 518 may detect, based on the continued monitoring, a wrapping-related performance issue with the execution of wrapped application 501. The application wrapper 518 may detect wrapping-related performance issues by monitoring operating parameters of the executing wrapped application 501. For example, the application wrapper 518 may determine, at step 702, that the database 520 is taking too long to complete transactions (e.g., in excess of a predetermined time limit), that the miss rate of cache 522 is too high (e.g., in excess of a predetermined miss rate limit), and/or that the size of database 520 is too large relative to the size of cache 522 (e.g., in excess of a predetermined target value for cache size ratio). The application wrapper 518 may analyze the value of an operating parameter or a combination of operating parameters at a specific point in time. Alternatively, the application wrapper 518 may analyze the value of an operating parameter or a combination of operating parameters for a predetermined or dynamically determined time interval. In another example, the application wrapper 518 may monitor the value of an operating parameter or a combination of operating parameters using a sliding time window.

The application wrapper 518 may monitor more than one operating parameter simultaneously and may monitor different operating parameters at different times. A first operating parameter may be monitored for a specific point of time, while a second operating parameter may be measured for a dynamically determined time interval (or any other combination for any number of operating parameters may be used). The application wrapper 518 may analyze the values of the operating parameters individually, relative to one another, relative to other system parameters, or in combination with one another. Additionally, the application wrapper 518 may dynamically modify, during execution of wrapped application 501, which operating parameters are monitored.

Once the application wrapper 518 detects a wrapping-related performance issue during the execution of wrapped application 501 (e.g., in this example, the performance issue is related to the size of cache 522), the method may continue to step 703. At step 703, the application wrapper 518 may determine whether the size of cache 522 is below a threshold limit. The threshold limit may be predetermined or dynamically determined at the time of execution of wrapped application 501. The threshold limit may be determined based on the size of the database 520, the amount of system resources being utilized by the execution of wrapped application 501, the percentage of system resources being utilized by the execution of wrapped application 501, any other system-related parameter, or any combination thereof. If the application wrapper 518 determines that the size of cache 522 is already at or above the threshold limit, the method may proceed to 706, at which alternative solutions to addressing the wrapping-related performance issue may be determined (e.g., by the application wrapper 518).

If application wrapper 518 determines, at step 703, that the size of cache 522 is below the threshold limit, the method may proceed to 704, where application wrapper 518 may determine if it is efficient to increase the size of cache 522. Efficiency may be determined by evaluating one or more factors in view of one or more predetermined thresholds. For example, the current size of cache 522 may be compared to a predefined threshold limit on the size of cache 522 to determine whether it would be efficient to increase the size of cache 522 (e.g., if the current size of cache 522 is less than the predefined threshold limit on the size of cache 522, then it may be determined that it is efficient to increase the size of cache 522; if the current size of cache 522 is equal to or greater than the predefined threshold limit on the size of cache 522, then it may be determined that it is not efficient to increase the size of cache 522). Increasing the size of cache 522 may have rippling effects on overall system performance. For example, memory on mobile device 500 is finite and if the size of cache 522 is above a certain threshold, application 501 may occupy a disproportionate amount of this memory. Thus, the size of cache 522 may be constrained by available system resources. In another example, increasing the size of cache 522 may result in an increase in the rate of page faults. Application wrapper may take these factors as well as any other relevant operating parameters into considering when weighing the efficiency of increasing the size of cache 522.

In other words, in determining whether it is efficient to increase the size of cache 522 (e.g., at step 704), application wrapper 518 may evaluate one or more factors, including an amount of available memory and/or a rate of page faults, in relation to one or more predetermined thresholds corresponding to the one or more factors. For example, if the amount of available memory is at or above a first predetermined threshold, then application wrapper 518 may determine that it is efficient to increase the size of cache 522, while if the amount of available memory is below the first predetermined threshold, then application wrapper 518 may determine that it is not efficient to increase the size of cache 522. As another example, if the rate of page faults is at or above a second predetermined threshold, then application wrapper 518 may determine that it is not efficient to increase the size of cache 522, while if the rate of page faults is below the second predetermined threshold, then application wrapper 518 may determine that it is efficient to increase the size of cache 522.

In one instance, application wrapper 518 may determine that increasing the size of cache 522 is efficient. In this instance, application wrapper 518 may modify execution of the wrapped application 501 to address the wrapping-related performance issue by increasing the size of cache 522. In making the modifications, the application wrapper 518 may consider constraints on the operating parameters (such as, for example, threshold limits, available resources, etc.). In one example, the size of the cache 522 may be increased to its threshold limit. In a second example, the size of the cache 522 may be incrementally increased by a predetermined amount. In a third example, the size of the cache 522 may be incrementally increased by a dynamically determined amount.

After increasing the cache size at step 705, the application wrapper 518 may return to step 701, where application wrapper 518 may resume the continuous monitoring of various operating parameters, including, but not limited to, those monitored at step 702. During the continuous monitoring, application wrapper 518 may aggregate the values of the continuously monitored parameter(s). The aggregated values may be persistently stored such that the values may be later utilized in the current execution of wrapped application 501 or during a subsequent execution of wrapped application 501 (e.g. these aggregated values may be used during a subsequent execution as historical values). In one instance, application wrapper 518 may detect a wrapper-related performance issue with the same operating parameter (e.g., the miss rate of cache 522 may still be too high). The application wrapper 518 may repeat evaluating the efficiency of increasing the size of cache 522 if the size of cache 522 is still below its threshold maximum. The application wrapper 518 may consider constraints on the operating parameters (such as, for example, threshold limits, available resources, etc.). In one example, the size of the cache 522 may be increased to its threshold limit. In a second example, the size of the cache 522 may be incrementally increased by a predetermined amount. In a third example, the size of the cache 522 may be incrementally increased by a dynamically determined amount. If the size of cache 522 is at its threshold, application wrapper 518 may determine alternative solutions at step 706. After determining and implementing alternative solutions, the application wrapper 518 may return to step 701, where application wrapper 518 may resume the continuous continue monitoring of various operating parameters, including, but not limited to, those monitored at step 702.

In a second instance, application wrapper 518 may detect a wrapper-related performance issue with a different operating parameter. For example, after having previously increased the size of cache 522 at step 705 and having returned to continuous monitoring step 701 (e.g., after step 705), application wrapper may subsequently determine, at step 702, that the rate of page faults is too high. Application wrapper 518 may determine that the increase in the rate of page faults is caused by the increased cache size and may then dynamically weigh the effects of decreasing the size of cache 522 (and thus decreasing the rate of page faults) versus maintaining the current size of cache 522 (and thus allowing the rate of page faults to remain high). In one instance, the application wrapper 518 may determine that it is more efficient to decrease the size of cache 522 and proceed accordingly. The size of cache 522 may be changed by a same or different incremental value each time. Subsequent to decreasing the size of cache 522, application wrapper 518 may return to step 701, where application wrapper 518 may resume the continuous continue monitoring of various operating parameters, including, but not limited to, those monitored at step 702. However, in another instance, the application wrapper 518 may determine that it is more efficient to maintain the size of cache 522 (i.e. it is more efficient to re-read unencrypted pages than to re-read and re-decrypt pages) and return to step 701, where application wrapper 518 may resume the continuous continue monitoring of various operating parameters, including, but not limited to, those monitored at step 702.

Figure 8:
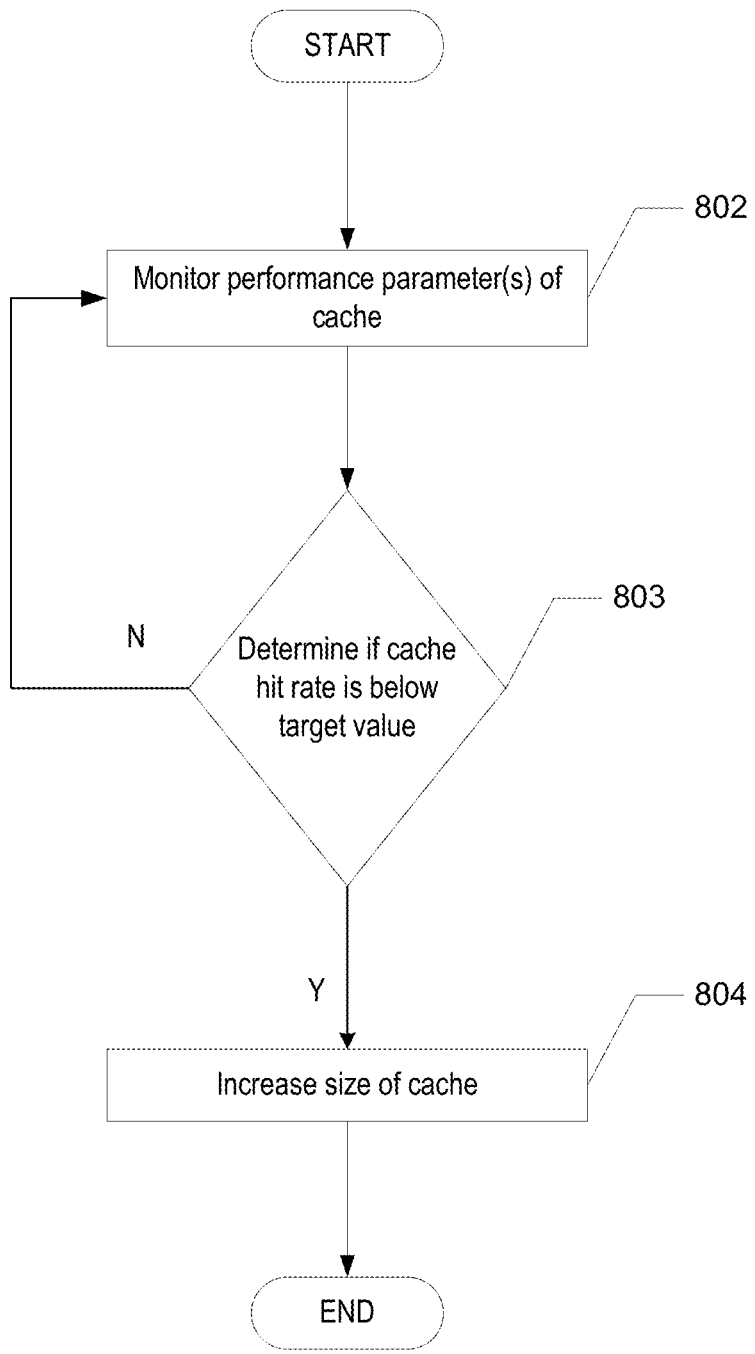

FIG. 8 depicts an illustrative method of improving performance of an execution of a wrapped application. The method may start before the wrapped application 501 begins executing on the mobile device 500, may be invoked at the time the wrapped application 501 begins executing on the mobile device 500, or may be invoked after the wrapped application 501 begins executing on the mobile device 500. At step 802, the application wrapper 518 monitors one or more performance parameters of the cache 522 during execution of wrapped application 501 to detect wrapping-related performance issues.

The application wrapper 518 may analyze the value of a performance parameter at a specific point in time. Alternatively, the application wrapper 518 may analyze the value of a performance parameter for a predetermined or dynamically determined time interval. In another example, the application wrapper 518 may monitor the value of a performance parameter using a sliding time window.

The application wrapper 518 may monitor more than one parameter simultaneously and may monitor different parameters at different times. For example, at step 802, application wrapper 518 may monitor the size of cache 522 and/or the hit rate of cache 522. A first performance parameter may be monitored for a specific point of time, while a second performance parameter may be measured for a dynamically determined time interval (or any other combination for any number of operating parameters may be used). The application wrapper 518 may analyze the values of the performance parameters individually, relative to one another, relative to other system parameters, or in combination with one another. Additionally, the application wrapper 518 may dynamically modify, during execution of wrapped application 501, which performance parameters are monitored.

At step 803, the application wrapper 518 may analyze one or more monitored performance parameters. For example, the application wrapper 518 may compare the hit rate of cache 522 with a target value. If the hit rate of cache 522 is at or above the target value, the application wrapper may return to step 802. If the hit rate of cache 522 is below the target value, the application wrapper 518 may proceed to step 804. The target value may be a scalar value, a percentage, or a range. The target value may be predetermined or dynamically calculated. For example, the target value may be dynamically calculated by analyzing other performance parameters, such as the size of cache 522, and/or by analyzing other operating parameters, such as the size of database 520, available system resources, or the like.

At step 804, based on a size of the cache 522 being below a threshold limit, the application wrapper 518 may increase a size of the cache to bring the size of cache 522 to an amount that does not exceed the threshold limit. The threshold limit may be predetermined or dynamically determined at the time of execution of wrapped application 501. The threshold limit may be determined based on the size of the database 520, the amount of system resources being utilized by the execution of wrapped application 501, the percentage of system resources being utilized by the execution of wrapped application 501, any other system-related parameter, or any combination thereof.

In making the modifications, the application wrapper 518 may consider constraints on the operating parameters (such as, for example, available system resources). In one example, the size of the cache 522 may be increased to its threshold limit. In a second example, the size of the cache 522 may be incrementally increased by a predetermined amount. In a third example, the size of the cache 522 may be incrementally increased by a dynamically determined amount.

Once the cache size has been modified, application wrapper 518 may continue monitoring various performance parameters, including, but not limited to, those monitored in step 802. If the application wrapper 518 detects a wrapper-related performance issue (for example, that the miss rate of cache 522 is still too high), the application wrapper 518 may repeat modification of the size of the cache 522 if the size of cache 522 is still below its threshold maximum.

The process of detecting the wrapping-related performance issue (for example, that the cache hit rate is below a target value) and modifying the size of cache 522 may be repeated until a target performance level or a threshold limit on the size of cache 522 is reached. The target performance level may be predetermined or dynamically calculated. The target performance level may be a percentage, a certain value, or a range. The size of cache 522 may be changed by a same or different incremental value each time.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
    executing, by a processor and based on a user selection among a plurality of application programs installed in a computing device, a wrapped application program installed in the computing device;
    detecting, by an application wrapper and during the execution of the wrapped application program wrapped by the application wrapper, at least one performance issue caused by a security policy of the application wrapper, wherein the application wrapper controls the execution of the wrapped application program by enforcing one or more policies on how the wrapped application program is executed;
    determining a plurality of operating parameters capable of improving the detected at least one performance issue;
    determining, by the application wrapper, during the execution of the wrapped application program, and for a selected time interval, that a first operating parameter associated with the at least one performance issue satisfies a target value; and
    dynamically modifying, by the application wrapper and during the execution of the wrapped application program, a second operating parameter that modifies the execution of the wrapped application program to address the detected at least one performance issue.

2. The method of claim 1, wherein the at least one performance issue is associated with a cache that stores one or more decrypted pages from a database that stores encrypted data to be exclusively used by the executed wrapped application program, and wherein the cache and the database are maintained within the wrapped application program.

3. The method of claim 2, wherein detecting the at least one performance issue comprises determining, by the application wrapper, that a cache miss rate exceeds a predetermined threshold.

4. The method of claim 2, wherein detecting the at least one performance issue comprises monitoring, by the application wrapper, a size of the cache relative to a size of the database.

5. The method of claim 2, wherein detecting the at least one performance issue comprises calculating, by the application wrapper, a number of transactions associated with the cache, and monitoring, by the application wrapper, a size of each transaction associated with the cache.

6. The method of claim 2, wherein the dynamically modifying comprises:
responsive to a determination that a size of the cache is below a threshold, determining whether the size of the cache should be adjusted based on an evaluation of one or more additional parameters, the one or more additional parameters comprising a rate of page faults; and
responsive to a determination that the size of the cache should be adjusted, adjusting, by the application wrapper, the size of the cache based on historical data associated with the cache.

7. The method of claim 2, further comprising:
repeating the detecting at least one performance issue; and
adjusting, based on a plurality of performance parameters, a size of the cache.

8. The method of claim 2, wherein the dynamically modifying comprises incrementally increasing a size of the cache by a dynamically determined amount.

9. The method of claim 1, wherein the dynamically modifying comprises:
weighing, based on a plurality of operating parameters associated with the detected at least one performance issue, a plurality of modification options that address the detected at least one performance issue.

10. One or more non-transitory computer-readable media having computer-executable instructions stored thereon that, when executed, cause at least one computing device to:
execute, based on a user selection among a plurality of application programs installed in a computing device, a wrapped application program installed in the computing device;
detect, by an application wrapper and during the execution of the wrapped application program wrapped by the application wrapper, at least one performance issue caused by a security policy of the application wrapper, wherein the application wrapper controls the execution of the wrapped application program by enforcing one or more policies on how the wrapped application program is executed;
determine a plurality of operating parameters capable of improving the detected at least one performance issue;
determine, by the application wrapper, during the execution of the wrapped application program, and for a selected time interval, that a first operating parameter associated with the at least one performance issue satisfies a target value; and
dynamically modify, by the application wrapper and during the execution of the wrapped application program, a second operating parameter that modifies the execution of the wrapped application program to address the detected at least one performance issue.

11. The one or more non-transitory computer-readable media of claim 10, wherein the at least one performance issue is associated with a cache storing one or more decrypted pages from a database that stores encrypted data to be exclusively used by the executed wrapped application program, and wherein the cache and the database are maintained within the wrapped application program.

12. The one or more non-transitory computer-readable media of claim 11, wherein detecting the at least one performance issue comprises monitoring, by the application wrapper, an amount of time required to complete one or more transactions associated with the cache.

13. The one or more non-transitory computer-readable media of claim 11, wherein detecting the at least one performance issue comprises calculating, by the application wrapper, a number of transactions associated with the cache, and monitoring, by the application wrapper, a size of each transaction associated with the cache.

14. The one or more non-transitory computer-readable media of claim 11, wherein the dynamically modifying comprises:
responsive to a determination that a size of the cache satisfies a threshold, determining, by the application wrapper and based on one or more additional operating parameters, whether a value of the one or more additional operating parameters should be modified; and
responsive to a determination that the value of the one or more additional operating parameters should be modified, modifying, by the application wrapper, the value of the one or more additional operating parameters.

15. The one or more non-transitory computer-readable media of claim 11, wherein the dynamically modifying comprises decreasing a size of the cache by a predetermined amount.

16. The one or more non-transitory computer-readable media of claim 11, having additional computer-executable instructions stored thereon that, when executed, further cause the at least one computing device to repeat the detecting at least one performance issue and dynamically modify a size of the cache, until the cache reaches a target performance level associated with a plurality of performance parameters.

17. The one or more non-transitory computer-readable media of claim 10, wherein the dynamically modifying comprises:
weighing, based on a plurality of operating parameters associated with the detected at least one performance issue, a plurality of modification options that address the detected at least one performance issue.

18. A method, comprising:
executing, by a processor and based on a user selection among a plurality of application programs installed in a computing device, a wrapped application program installed in the computing device;
monitoring, by an application wrapper and during the execution of the wrapped application program wrapped by the application wrapper, one or more performance parameters associated with the wrapped application program for a selected time interval, wherein the application wrapper controls the execution of the wrapped application program by enforcing one or more policies on the wrapped application program, and wherein the performance parameters are affected by a security policy enforced by the execution of the wrapped application program;

determining a plurality of operating parameters capable of improving the one or more performance parameters;

determining, by the application wrapper, during the execution of the wrapped application program, and for the selected time interval, that a first operating parameter associated with the one or more performance parameters satisfies a target value; and dynamically modifying, by the application wrapper and during the execution of the wrapped application program, a second operating parameter that modifies the execution of the wrapped application program to address the one or more performance parameters.

19. The method of claim 18, wherein the second operating parameter comprises page size for cached data.

\* \* \* \* \*